United States Patent [19]

Dawson et al.

[11] Patent Number: 5,179,638
[45] Date of Patent: Jan. 12, 1993

[54] METHOD AND APPARATUS FOR GENERATING A TEXTURE MAPPED PERSPECTIVE VIEW

[75] Inventors: John F. Dawson; Thomas D. Snodgrass; James A. Cousens, all of Albuquerque, N. Mex.

[73] Assignee: Honeywell Inc., Minneapolis, Minn.

[21] Appl. No.: 514,598

[22] Filed: Apr. 26, 1990

[51] Int. Cl.$^5$ .............................................. G06F 15/62
[52] U.S. Cl. .................................... 395/125; 395/127; 395/130
[58] Field of Search ............... 395/125, 126, 127, 130; 364/443, 723; 340/729

[56] References Cited

U.S. PATENT DOCUMENTS

| | | | |
|---|---|---|---|
| 4,677,576 | 6/1987 | Berlin, Jr. et al. | 395/127 X |
| 4,876,651 | 10/1989 | Dawson et al. | 395/126 X |
| 4,884,220 | 11/1989 | Dawson et al. | 395/125 |
| 4,899,293 | 2/1990 | Dawson et al. | 395/125 X |
| 4,940,972 | 7/1990 | Mouchot et al. | 395/125 X |
| 4,985,854 | 1/1991 | Wittenburg | 395/126 X |
| 5,020,014 | 5/1991 | Miller et al. | 364/723 |

Primary Examiner—Gary V. Harkcom
Assistant Examiner—Mark K. Zimmerman
Attorney, Agent, or Firm—Ronald E. Champion; George A. Leone, Sr.

[57] ABSTRACT

A method and apparatus for providing a texture mapped perspective view for digital map systems. The system includes apparatus for storing elevation data, apparatus for storing texture data, apparatus for scanning a projected view volume from the elevation data storing apparatus, apparatus for processing, apparatus for generating a plurality of planar polygons and apparatus for rendering images. The processing apparatus further includes apparatus for receiving the scanned projected view volume from the scanning apparatus, transforming the scanned projected view volume from object space to screen space, and computing surface normals at each vertex of each polygon so as to modulate texture space pixel intensity. The generating apparatus generates the plurality of planar polygons from the transformed vertices and supplies them to the rendering apparatus which then shades each of the planar polygons. In one alternate embodiment of the invention, the polygons are shaded by apparatus of the rendering apparatus assigning one color across the surface of each polygon. In yet another alternate embodiment of the invention, the rendering apparatus interpolates the intensities between the vertices of each polygon in a linear fashion as in Gouraud shading.

8 Claims, 7 Drawing Sheets

TEXTURE

SCREEN

CO-LOCATED AERIAL PHOTOGRAPH

DMA ELEVATION DATA

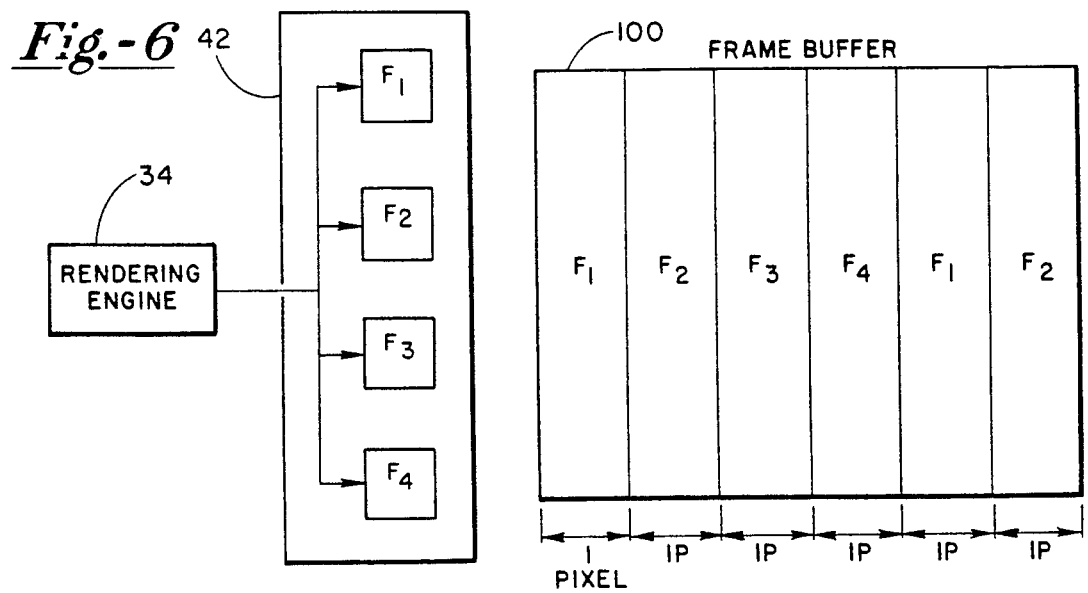
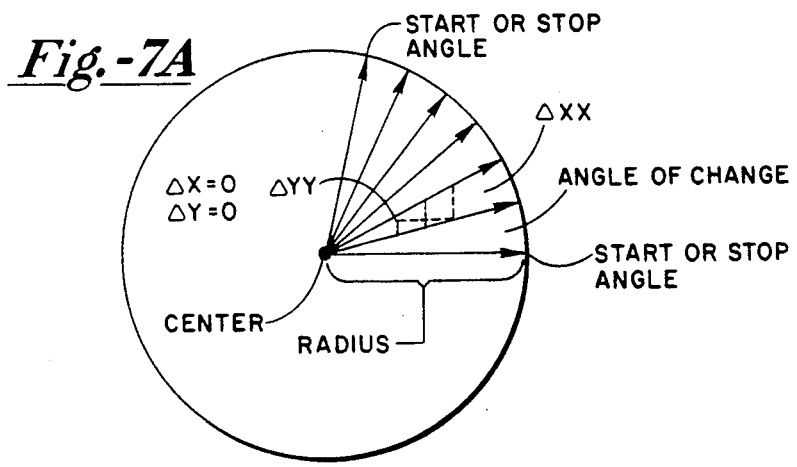
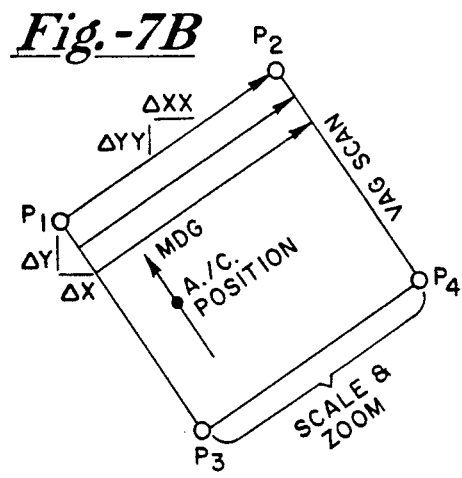
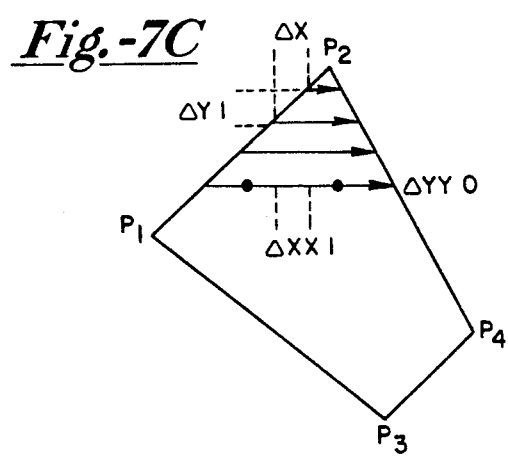

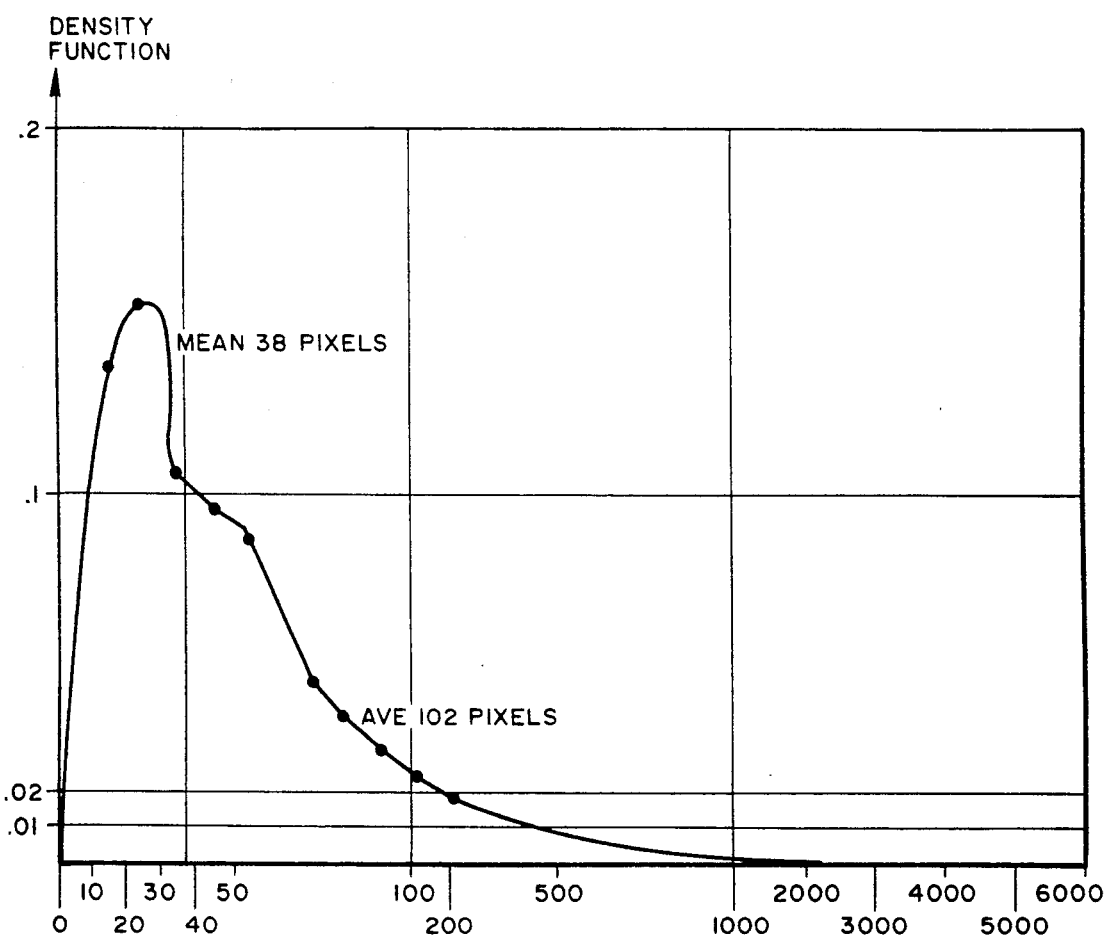

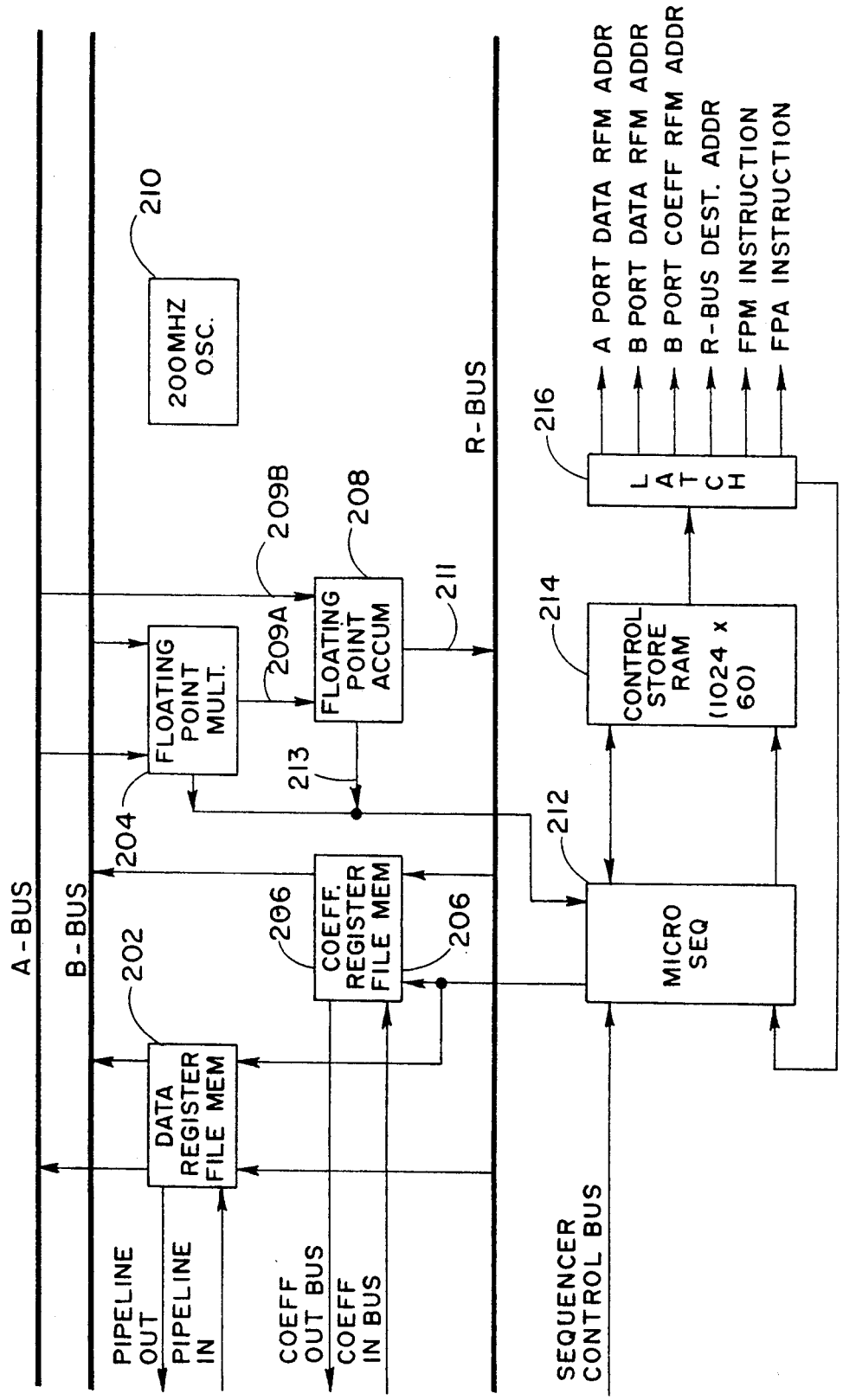

WORLD SPACE
DTED POSTS

CO-LOCATED TEXTURE SPACE

SCREEN SPACE

RENDERED POLYGON

METHOD AND APPARATUS FOR GENERATING A TEXTURE MAPPED PERSPECTIVE VIEW

The present invention is directed generally to graphic display systems and, more particularly, to a method and apparatus for generating texture mapped perspective views for a digital map system.

RELATED APPLICATIONS

The following applications are included herein by reference:

(1) U.S. Pat. No. 4,876,651 filed May 11, 1988, issued Oct. 24, 1989 entitled "Digital Map System" which was assigned to the assignee of the present invention;

(2) Assignee copending application Ser. No. 09/514,685 filed Apr. 26, 1990, entitled "High Speed Processor for Digital Signal Processing";

(3) U.S. Pat. No. 4,884,220 entitled "Generator with Variable Scan Patterns" filed Jun. 7, 1988, issued Nov. 28, 1989, which is assigned to the assignee of the present invention;

(4) U.S. Pat. No. 4,899,293 entitled "A method of Storage and Retrieval of Digital Map Data Based Upon a Tessellated Geoid System", filed Dec. 14, 1988, issued Feb. 6, 1990;

(5) U.S. Pat. No. 5,020,014 entitled "Generic Interpolation Pipeline Processor", filed Feb. 7, 1989, issued May 28, 1991, which is assigned to the assignee of the present invention;

(6) Assignee's copending patent application Ser. No. 07/732,725 filed Jul. 18, 1991 entitled "Parallel Polygon/Pixel Rendering Engine Architecture for Computer Graphics" which is a continuation of patent application 07/419,722 filed Oct. 11, 1989 now abandoned;

(7) Assignee's copending patent application Ser. No. 07/514,724 filed Apr. 26, 1990 entitled "Polygon Tiling Engine";

(8) Assignee's copending patent application Ser. No. 07/514,723 filed Apr. 26, 1990 entitled "Polygon Sort Engine"; and (9) Assignee's copending patent application Ser. No. 07/514,742 filed Apr. 26, 1990 entitled "Three Dimensional Computer Graphic Symbol Generator".

BACKGROUND OF THE INVENTION

Texture mapping is a computer graphics technique which comprises a process of overlaying aerial reconnaissance photographs onto computer generated three dimensional terrain images. It enhances the visual reality of raster scan images substantially while incurring a relatively small increase in computational expense. A frequent criticism of known computer-generated synthesized imagery has been directed to the extreme smoothness of the image. Prior art methods of generating images provide no texture, bumps, outcroppings, or natural abnormalities in the display of digital terrain elevation data (DTED).

In general, texture mapping maps a multidimensional image to a multidimensional space. A texture may be thought of in the usual sense such as sandpaper, a plowed field, a roadbed, a lake, woodgrain and so forth or as the pattern of pixels (picture elements) on a sheet of paper or photographic film. The pixels may be arranged in a regular pattern such as a checkerboard or may exhibit high frequencies as in a detailed photograph of high resolution LandSat imagery. Texture may also be three dimensional in nature as in marble or woodgrain surfaces. For the purposes of the invention, texture mapping is defined to be the mapping of a texture onto a surface in three dimensional object space. As is illustrated schematically in FIG. 1, a texture space object T is mapped to a display screen by means of a perspective transformation.

The implementation of the method of the invention comprises two processes. The first process is geometric warping and the second process is filtering. FIG. 2 illustrates graphically the geometric warping process of the invention for applying texture onto a surface. This process applies the texture onto an object to be mapped analogously to a rubber sheet being stretched over a surface. In a digital map system application, the texture typically comprises an aerial reconnaissance photograph and the object mapped is the surface of the digital terrain data base as shown in FIG. 2. After the geometric warping has been completed, the second process of filtering is performed. In the second process, the image is resampled on the screen grid.

The invention provides a texture mapped perspective view architecture which addresses the need for increased aircraft crew effectiveness, consequently reducing workload, in low altitude flight regimes characterized by the simultaneous requirement to avoid certain terrain and threats. The particular emphasis of the invention is to increase crew situational awareness. Crew situational awareness has been increased to some degree through the addition of a perspective view map display to a plan view capability which already exists in digital map systems. See, for example, assignee's copending application Ser. No. 07/192,798, for a DIGITAL MAP SYSTEM, filed May 11, 1988, issued Oct. 24, 1989 as U.S. Pat. No. 4,876,651 which is incorporated herein by reference in its entirety. The present invention improves the digital map system capability by providing a means for overlaying aerial reconnaissance photographs over the computer generated three dimensional terrain image resulting in a one-to-one correspondence from the digital map image to the real world. In this way the invention provides visually realistic cues which augment the informational display of such a computer generated terrain image. Using these cues an aircraft crew can rapidly make a correlation between the display and the real world.

The architectural challenge presented by texture mapping is that of distributing the processing load to achieve high data throughput using parallel pipelines and then recombining the parallel pixel flow into a single memory module known as a frame buffer. The resulting contention for access to the frame buffer reduces the effective throughput of the pipelines in addition to requiring increased hardware and board space to implement the additional pipelines. The method and apparatus of the invention addresses this challenge by effectively combining the low contention attributes of a single high speed pipeline with the increased processing throughput of parallel pipelines.

SUMMARY OF THE INVENTION

A method and apparatus for providing a texture mapped perspective view for digital map systems is provided. The invention comprises means for storing elevation data, means for storing texture data, means for scanning a projected view volume from the elevation data storing means, means for processing the projected view volume, means for generating a plurality of planar polygons and means for rendering images. The processing means further includes means for receiving the scanned projected view volume from the scanning means, transforming the scanned projected view volume from object space to screen space, and computing surface normals at each vertex of each polygon so as to modulate texture space pixel intensity. The generating means generates the plurality of planar polygons from the transformed vertices and supplies them to the rendering means which then shades each of the planar polygons.

A primary object of the invention is to provide a technology capable of accomplishing a fully integrated digital map display system in an aircraft cockpit.

In one alternate embodiment of the invention, the polygons are shaded by means of the rendering means assigning one color across the surface of each polygon.

In yet another alternate embodiment of the invention, the rendering means interpolates the intensities between the vertices of each polygon in a linear fashion as in Gouraud shading.

It is yet another object of the invention to provide a digital map system including capabilities for perspective view, transparency, texture mapping, hidden line removal, and secondary visual effects such as depth cues and artifact (i.e., anti-aliasing) control.

It is yet another object of the invention to provide the capability for displaying forward looking infrared (FLIR) data and radar return images overlaid onto a plan and perspective view digital map image by fusing images through combining or subtracting other sensor video signals with the digital map terrain display.

It is yet another object of the invention to provide a digital map system with an arbitrary warping capability of one data base onto another data base which is accommodated by the perspective view texture mapping capability of the invention.

Other objects, features and advantages of the invention will become apparent to those skilled in the art through the drawings, description of the preferred embodiment and claims herein. In the drawings, like numerals refer to like elements.

BRIEF DESCRIPTION OF THE DRAWINGS

FIG. 6 schematically illustrates the frame buffer configuration as employed by one embodiment of the invention.

FIGS. 7a, 7b and 7c illustrate three examples of display format shapes.

FIG. 8 graphs the density function for maximum pixel counts.

FIG. 9 is a block diagram of one embodiment of the geometry array processor as employed by the invention.

DESCRIPTION OF THE PREFERRED EMBODIMENT

Generally, perspective transformation from texture space having coordinates U, V to screen space having coordinates X, Y requires an intermediate transformation from texture space to object space having coordinates $X_0$, $Y_0$, $Z_0$. Perspective transformation is accomplished through the general perspective transform equation as follows:

$$[X\ Y\ Z\ H] = [X\ Y\ Z\ 1] \times \begin{bmatrix} A & B & C & | & P \\ D & E & F & | & Q \\ G & H & I & | & R \\ L & M & N & | & S \end{bmatrix}$$

where a point (X,Y,Z) in 3-space is represented by a four dimensional position vector [X Y Z H] in homogeneous coordinates.

The $3 \times 3$ sub-matrix $$\begin{bmatrix} A & B & C \\ D & E & F \\ G & H & I \end{bmatrix}$$

accomplishes scaling, shearing, and rotation.

The $1 \times 3$ row matrix [L M N] produces translation.

The $3 \times 1$ column matrix $$\begin{bmatrix} P \\ Q \\ R \end{bmatrix}$$

produces perspective transformation.

The $1 \times 1$ scalar [S] produces overall scaling.

Figure 1:
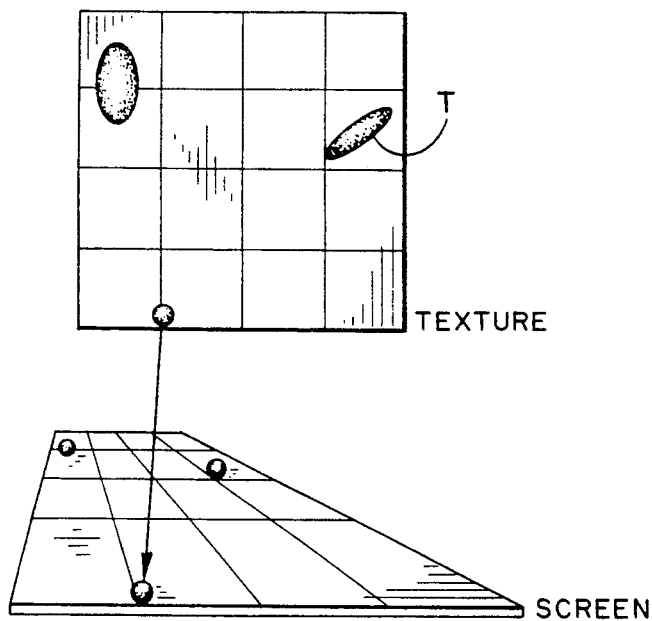
FIG. 1 shows the mapping of a textured object to a display screen by a perspective transformation.
Figure 2:
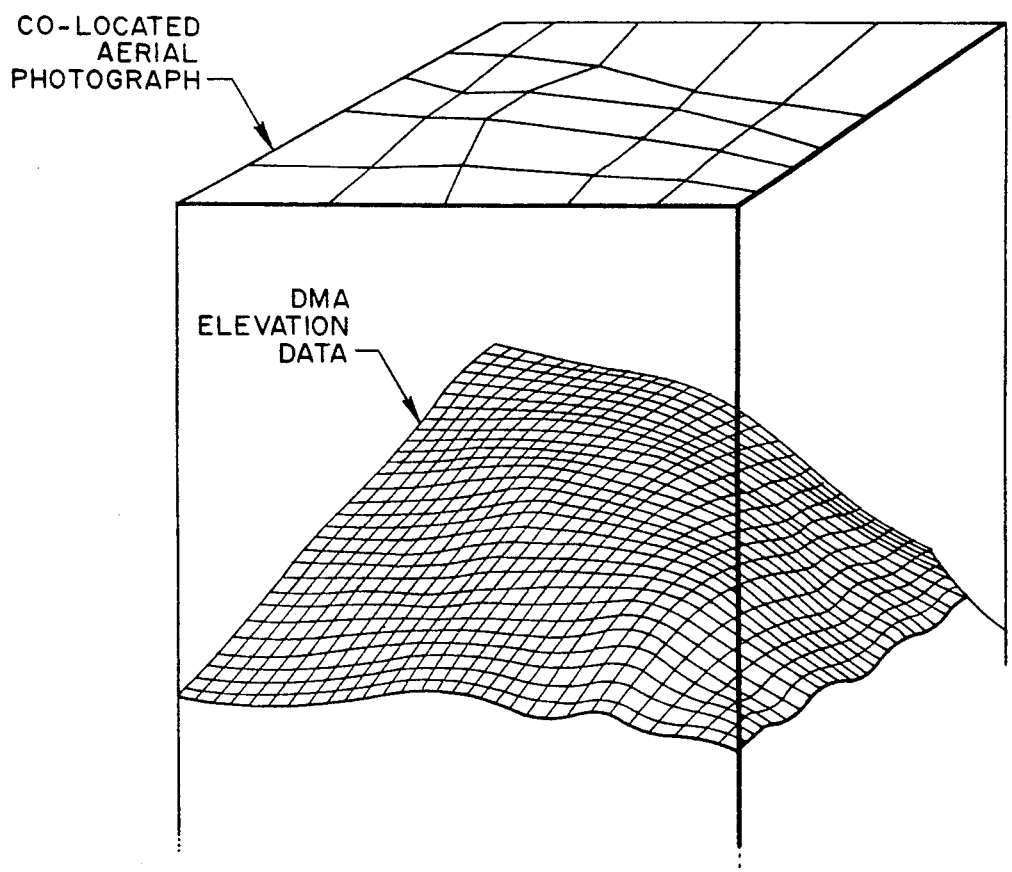
FIG. 2 illustrates graphically the geometric warping process of the invention for applying texture onto a surface.
Figure 3:
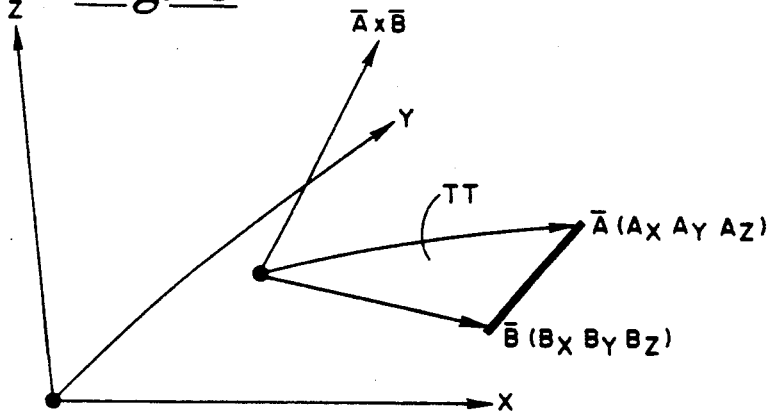
FIG. 3 illustrates the surface normal calculation as employed by the invention.

The Cartesian cross-product needed for surface normal requires a square root. As shown in FIG. 3, the surface normal shown is a vector $A \times B$ perpendicular to the plane formed by edges of a polygon as represented by vectors A and B, where $A \times B$ is the Cartesian cross-product of the two vectors. Normalizing the vector allows calculation for sun angle shading in a perfectly diffusing Lambertian surface. This is accomplished by taking the vector dot product of the surface normal vector with the sun position vector. The resulting angle is inversely proportional to the intensity of the pixel of the surface regardless of the viewing angle. This intensity is used to modulate the texture hue and intensity value.

$$\frac{A \times B}{||A||\,||B||} \text{ where } \begin{aligned} A &= Ax^2 + Ay^2 + Az^2 \\ B &= Bx^2 + By^2 + Bz^2 \end{aligned}$$

A terrain triangle TT is formed by connecting the endpoints of vectors A and B, from point $B_X$, $B_Y$, $B_Z$ to point $A_X$, $A_Y$, $A_Z$.

Having described some of the fundamental basis for the invention, a description of the method of the invention will now be set out in more detail below.

Figure 4:
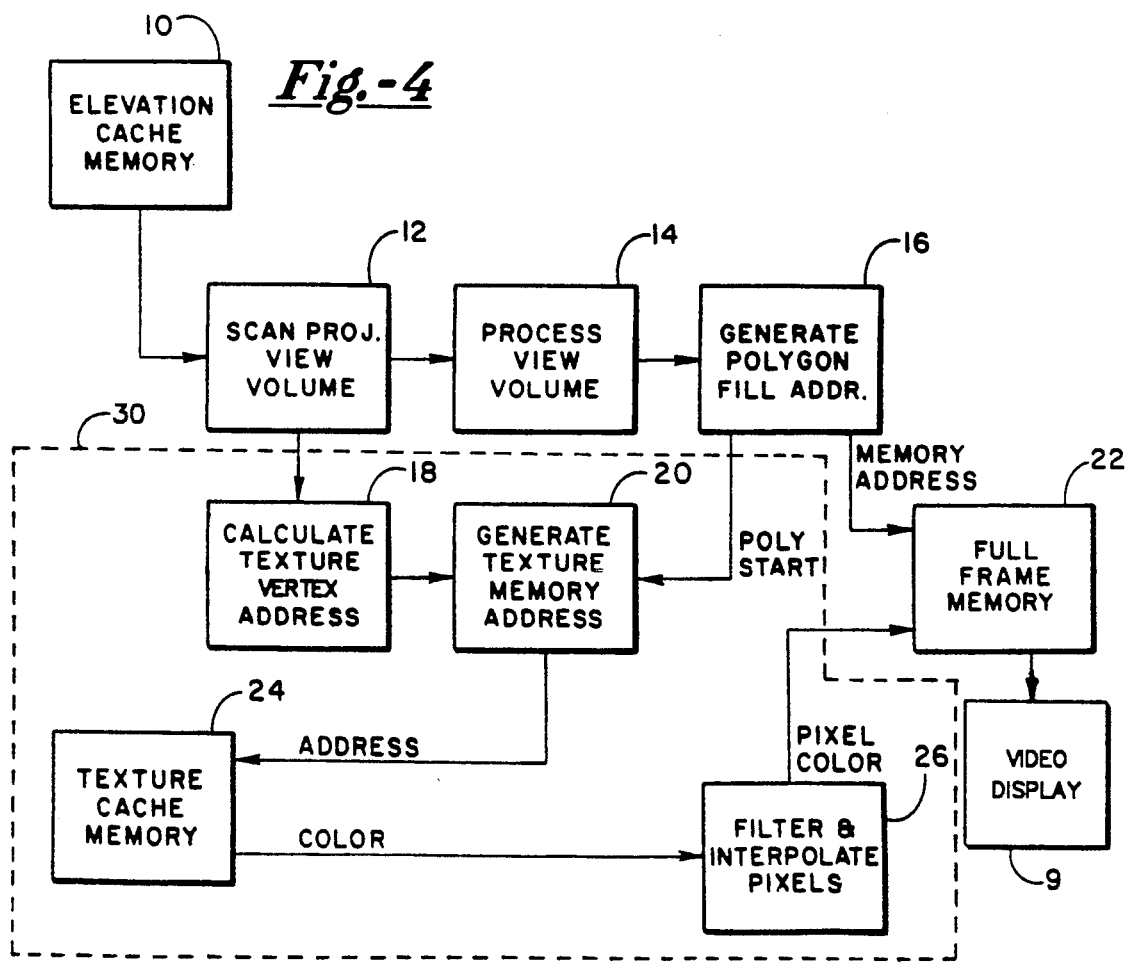
FIG. 4 presents a functional block diagram of one embodiment of the invention.

Referring now to FIG. 4, a functional block diagram of one embodiment of the invention is shown. The invention functionally comprises a means for storing elevation data 10, a means for storing texture data 24, a means for scanning a projected view volume from the elevation data storing means 12, means for processing view volume 14 including means for receiving the scanned projected view volume from the scanning means 12, means for generating polygon fill addresses 16, means for calculating texture vertices addresses 18, means for generating texture memory addresses 20, means for filtering and interpolating pixels 26, a full-frame memory 22, and video display 9. The processing means 14 further includes means for transforming the scanned projected view volume from object space to screen space and means for computing surface normals at each vertex of each polygon so as to calculate pixel intensity.

Figure 5:
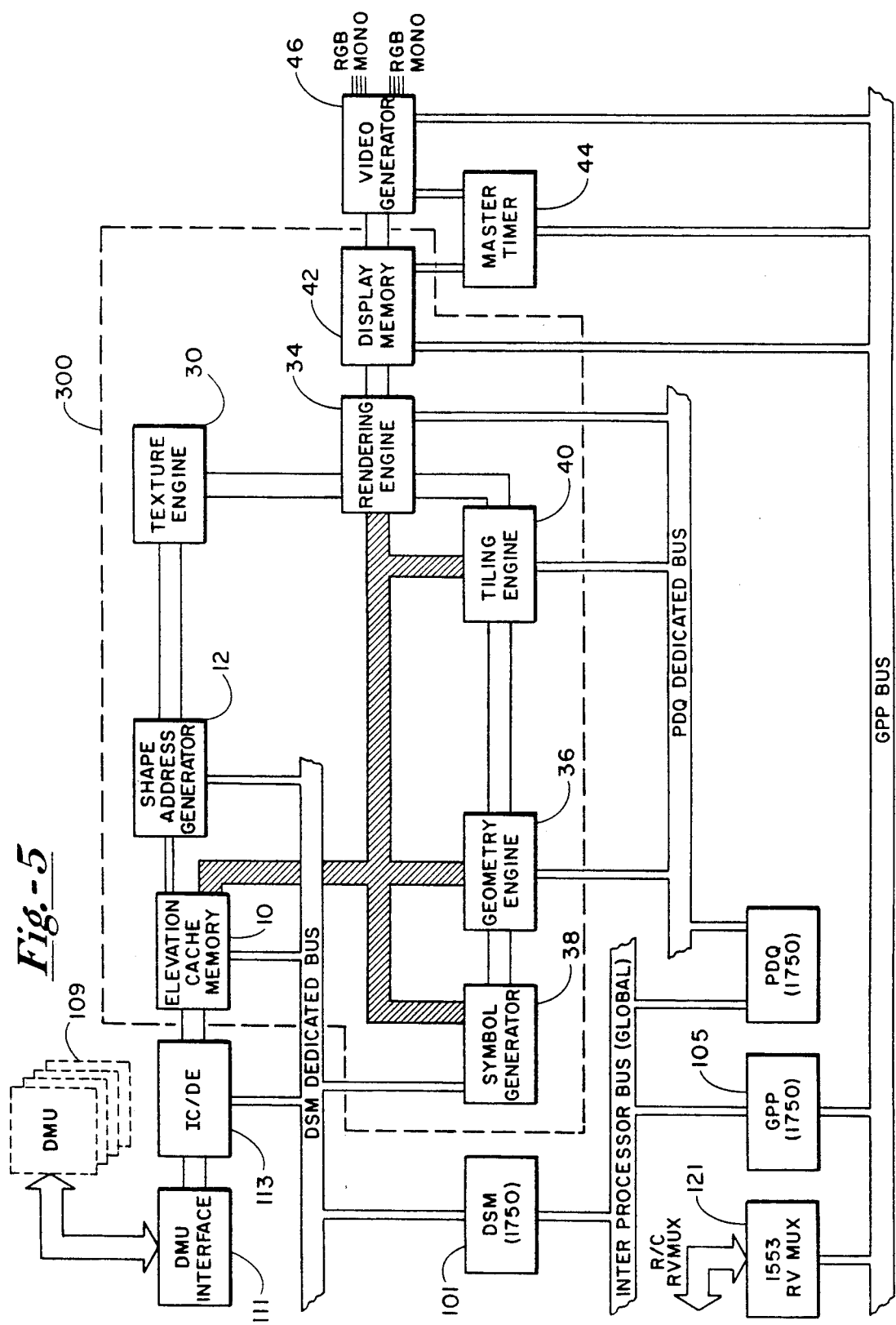
FIG. 5 illustrates a top level block diagram of one embodiment of the texture mapped perspective view architecture of the invention.

The means for storing elevation data 10 may preferably be a cache memory having at least a 50 nsec access time to achieve 20 Hz bi-linear interpolation of a 512×512 pixel resolution screen. The cache memory further may advantageously include a 256×256 bit buffer segment with 2K bytes of shadow RAM used for the display list. The cache memory may arbitrarily be reconfigured from 8 bits deep (data frame) to 64 bits (i.e., comprising the sum of texture map data (24 bits)+DTED (16 bits)+aeronautical chart data (24 bits)). A buffer segment may start at any cache address and may be written horizontally or vertically. Means for storing texture data 24 may advantageously be a texture cache memory which is identical to the elevation cache memory except that it stores pixel information for warping onto the elevation data cache. Referring now to FIG. 5, a top level block diagram of the texture mapped perspective view architecture is shown. The architecture implements the functions as shown in FIG. 4 and the discussion which follows shall refer to functional blocks in FIG. 4 and corresponding elements in FIG. 5. In some cases, such as element 14, there is a one-to-one correspondence between the functional blocks in FIG. 4 and the architectural elements of FIG. 5. In other cases, as explained hereinbelow, the functions depicted in FIG. 4 are carried out by a plurality of elements shown in FIG. 5. The elements shown in FIG. 5 comprising the texture mapped perspective view system 300 of the invention include elevation cache memory 10, shape address generator (SHAG) 12, texture engine 30, rendering engine 34, geometry engine 36, symbol generator 38, tiling engine 40, and display memory 42. These elements are typically part of a larger digital map system including a digital map unit (DMU) 109, DMU interface 111, IC/DE 113, a display stream manager (DSM) 101, a general purpose processor (GPP) 105, RV MUX 121, PDQ 123, master time 44, video generator 46 and a plurality of data bases. The latter elements are described in assignee's Digital Map System U.S. Pat. No. 4,876,651.

GEOMETRY ENGINE

The geometry engine 36 is comprised of one or more geometry array processors (GAPs) which process the 4×4 Euler matrix transformation from object space (sometimes referred to as "world" space) to screen space. The GAPs generate X and Y values in screen coordinates and Zvv values in range depth. The GAPs also compute surface normals at each vertex of a polygon representing an image in object space via Cartesian cross-products for Gouraud shading, or they may assign one surface normal to the entire polygon for flat shading and wire mesh. Intensity calculations are performed using a vector dot product between the surface normal or normals and the illumination source to implement a Lambertian diffusely reflecting surface. Hue and intensity values are then assigned to the polygon. The method and apparatus of the invention also provides a dot rendering scheme wherein the GAPs only transform one vertex of each polygon and the tiling engine 40, explained in more detail below, is inhibited. In this dot rendering format, hue and intensity are assigned based on the planar polygon containing the vertex and the rendering engine is inhibited. Dot polygons may appear in the same image as multiple vertex polygons or may comprise the entire image itself. The "dots" are passed through the polygon rendering engine 34. A range to the vertices or polygon (Zvv) is used if a fog or "DaVinci" effect are invoked as explained below. The GAPs also transform three dimensional overlay symbols from world space to screen space.

Referring now to FIG. 9, a block diagram of one example embodiment of a geometry array processor (GAP) is shown. The GAP comprises a data register file memory 202, a floating point multiplier 204, a coefficient register file memory 206, a floating point accumulator 208, a 200 MHz oscillator 210, a microsequencer 212, a control store RAM 214, and latch 216.

The register file memory may advantageously have a capacity of 512 by 32 bits. The floating point accumulator 208 includes two input ports 209A and 209B with independent enables, one output port 211, and a condition code interface 212 responsive to error codes. The floating point accumulator operates on four instructions, namely, multiply, no-op, pass A, and pass B. The microsequencer 212 operates on seven instructions including loop on count, loop on condition, jump, continue, call, return and load counter. The microsequencer includes a debug interface having a read/write (R/W) internal register, R/W control store memory, halt on address, and single step, and further includes a processor interface including a signal interrupt, status register and control register. The GAP is fully explained in the assignee's co-pending application No. 07/514,685 filed Apr. 26, 1990 entitled High Speed Processor for Digital Signal Processing which is incorporated herein by reference in its entirety.

In one alternative embodiment of the invention, it is possible to give the viewer of the display the visual effect of an environment enshrouded in fog. The fog option is implemented by interpolating the color of the triangle vertices toward the fog color. As the triangles get smaller with distance, the fog particles become denser. By using the known relationship between distance and fog density, the fog thickness can be "dialed" or adjusted as needed. The vertex assignment interpolates the vertex color toward the fog color as a function of range toward the horizon. The fog technique may be implemented in the hardware version of the GAP such as may be embodied in a GaAs semiconductor chip. If a linear color space (typically referred to as "RGB" to reflect the primary colors, red, green and blue) is assumed, the amount of fog is added as a function of range to the polygon vertices' color computation by well known techniques. Thus, as the hue is assigned by elevation banding or monochrome default value, the fog color is tacked on. The rendering engine 34, explained in more detail below, then straight forwardly interpolates the interior points.

In another alternative embodiment of the invention, a DaVinci effect is implemented. The DaVinci effect causes the terrain to fade into the distance and blend with the horizon. It is implemented as a function of range of the polygon vertices by the GAP. The horizon color is added to the vertices similarly to the fog effect.

SHAPE ADDRESS GENERATOR (SHAG)

The SHAG 12 receives the orthographically projected view volume outline onto cache from the DSM. It calculates the individual line lengths of the scans and the delta x and delta y components. It also scans the elevation posts out of the elevation cache memory and passes them to the GAPs for transformation. In one embodiment of the invention, the SHAG preferably includes two arithmetic logic units (ALUs) to support the 50 nsec cache 10. In the SHAG, data is generated for the GAPs and control signals are passed to the tiling engine 40. DFAD data is downloaded into overlay RAM (not shown) and three dimensional symbols are passed to the GAPs from symbol generator 38. Elevation color banding hue assignment is performed in this function. The SHAG generates shapes for plan view, perspective view, intervisibility, and radar simulation. These are illustrated in FIG. 7. The SHAG is more fully explained in assignee's copending application, Ser. No. 203,660, Generator With Variable Scan Patterns, filed Jun. 7, 1988 issued as U.S. Pat. No. 4,884,220 on Nov. 28, 1989 which is incorporated herein by reference in its entirety.

A simple Lambertian lighting diffusion model has proved adequate for generating depth cueing in one embodiment of the invention. The sun angle position is completely programmable in azimuth and zenith. It may also be self-positioning based on time of day, time of year, latitude and longitude. A programmable intensity with gray scale instead of color implements the moon angle position algorithm. The display stream manager (DSM) programs the sun angle registers. The illumination intensities of the moon angle position may be varied with the lunar waxing and waning cycles.

TILING ENGINE AND TEXTURE ENGINE

Figure 10A:
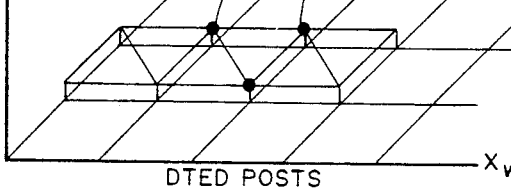
FIGS. 10A, 10B, 10C and 10D illustrated the tagged architectural texture mapping as provided by the invention.
Figure 10B:
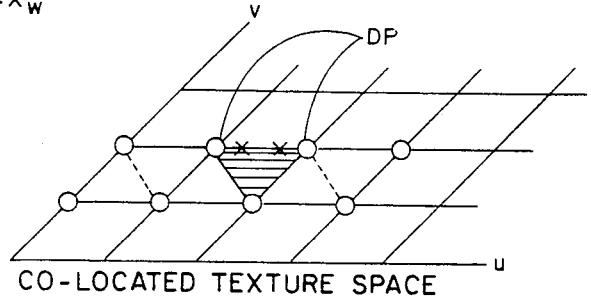
Figure 10C:
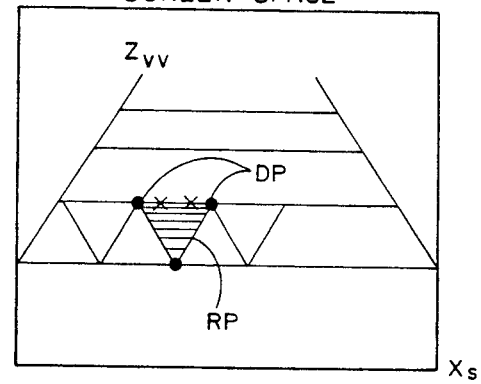
Figure 10D:
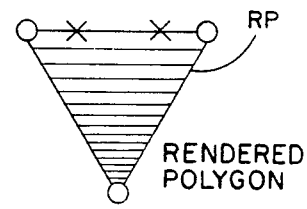

Still referring to FIGS. 4 and 5, the means for calculating texture vertex address 18 may include the tiling engine 40. Elevation posts are vertices of planar triangles modeling the surface of the terrain. These posts are "tagged" with the corresponding U,V coordinate address calculated in texture space. This tagging eliminates the need for interpolation by substituting an address lookup. Referring to FIGS. 10A, 10B, 10C and 10D, with continuing reference to FIGS. 4 and 5, the tagged architectural texture mapping as employed by the invention is illustrated. FIG. 10A shows an example of DTED data posts, DP, in world space. FIG. 10B shows the co-located texture space for the data posts. FIG. 10C shows the data posts and rendered polygon in screen space. FIG. 10D illustrates conceptually the interpolation of tagged addresses into a rendered polygon RP. The texture engine 30 performs the tagged data structure management and filtering processes. When the triangles are passed to the rendering engine by the tiling engine for filling with texture, the tagged texture address from the elevation post is used to generate the texture memory address. The texture value is filtered by filtering and interpolation means 26 before being written to full-frame memory 22 prior to display.

The tiling engine generates the planar polygons from the transformed vertices in screen coordinates and passes them to the rendering engine. For terrain polygons, a connectivity offset from one line scan to the next is used to configure the polygons. For overlay symbols, a connectivity list is resident in a buffer memory (not shown) and is utilized for polygon generation. The tiling engine also informs the GAP if it is busy. In one embodiment 512 vertices are resident in a 1K buffer.

All polygons having surface normals more than 90 degrees from LOS are eliminated from rendering. This is known in the art as backface removal. Such polygons do not have to be transformed since they will not be visible on the display screen. Additional connectivity information must be generated if the polygons are non-planar as the transformation process generates implied edges. This requires that the connectivity information be dynamically generated. Thus, only planar polygons with less than 513 vertices are implemented. Non-planar polygons and dynamic connectivity algorithms are not implemented by the tiling engine. The tiling engine is further detailed in assignee's copending applications of even filing date herewith entitled Polygon Tiling Engine, as referenced hereinabove and Polygon Sort Engine, as referenced hereinabove, both of which are incorporated herein by reference.

RENDERING ENGINE

Referring again to FIG. 5, the rendering engine 34 of the invention provides a means of drawing polygons in a plurality of modes. The rendering engine features may include interpolation algorithms for processing coordinates and color, hidden surface removal, contour lines, aircraft relative color bands, flat shading, Gourand shading, phong shading, mesh format or screen door effects, ridgeline display, transverse slice, backface removal and RECE (aerial reconnaissance) photo modes. With most known methods of image synthesis, the image is generated by breaking the surfaces of the object into polygons, calculating the color and intensity at each vertex of the polygon, and drawing the results into a frame buffer while interpolating the colors across the polygon. The color information at the vertices is calculated from light source data, surface normal, elevation and/or cultural features.

The interpolation of coordinate and color (or intensity) across each polygon must be performed quickly and accurately. This is accomplished by interpolating the coordinate and color at each quantized point or pixel on the edges of the polygon and subsequently interpolating from edge to edge to generate the fill lines. For hidden surface removal, such as is provided by a Z-buffer in a well-known manner, the depth or Z-value for each pixel is also calculated. Furthermore, since color components can vary independently across a surface or set of surfaces, red, green and blue intensities are interpolated independently. Thus, a minimum of six different parameters (X,Y,Z,R,G,B) are independently calculated when rendering polygons with Gouraud shading and interpolated Z-values.

Additional features of the rendering engine include a means of providing contour lines and aircraft relative color bands. For these features the elevation also is interpolated at each pixel. Transparency features dictate that an alpha channel be maintained and similarly interpolated. These requirements imply two additional axes of interpolation bringing the total to eight. The rendering engine is capable of processing polygons of one vertex in its dot mode, two vertices in its line mode, and three to 512 coplanar vertices in its polygon mode.

In the flat shading mode the rendering engine assigns the polygon a single color across its entire surface. An arbitrary vertex is selected to assign both hue and intensity for the entire polygon. This is accomplished by assigning identical RGB values to all vertices. Interpolation is performed normally but results in a constant value. This approach will not speed up the rendering process but will perform the algorithm with no hardware impact.

The Gouraud shading algorithm included in the rendering engine interpolates the intensities between the vertices of each polygon rendered in a linear fashion. This is the default mode. The Phong shading algorithm interpolates the surface normals between the vertices of the polygon between applying the intensity calculations. The rendering engine would thus have to perform an illumination calculation at each pixel after interpolation. This approach would significantly impact the hardware design. This algorithm may be simulated, however, using a weighing function (typically a function of cosine ($\Theta$)) around a narrow band of the intensities. This results in a non-linear interpolation scheme and provides for a simulated specular reflectance. In an alternative embodiment, the GAP may be used to assign the vertices of the polygon this non-linear weighing via the look-up table and the rendering engine would interpolate as in Gouraud shading.

Transparency is implemented in the classical sense using an alpha channel or may be simulated with a screen door effect. The screen door effect simply renders the transparent polygon as normal but then only outputs every other or every third pixel. The mesh format appears as a wire frame overlay with the option of rendering either hidden lines removed or not. In the case of a threat dome symbol, all polygon edges must be displayed as well as the background terrain. In such a case, the fill algorithm of the rendering engine is inhibited and only the polygon edges are rendered. The intensity interpolation is performed on the edges which may have to be two pixels wide to eliminate strobing. In one embodiment, an option for terrain mesh includes the capability for tagging edges for rendering so that the mesh appears as a regular orthogonal grid.

Typical of the heads up display (HUD) format used in aircraft is the ridgeline display and the transverse slice. In the ridgeline format, a line drawing is produced from polygon edges whose slopes change sign relative to the viewpoint. All polygons are transformed, tiled, and then the surface normals are computed and compared to the viewpoint. The tiling engine strips away the vertices of non-ridge contributing edges and passes only the ridge polygons to the rendering engine. In transverse slice mode, fixed range bins relative to the aircraft are defined. A plane orthogonal to the view LOS is then passed through for rendering. The ridges then appear to roll over the terrain as the aircraft flies along. These algorithms are similar to backface removal. They rely upon the polygon surface normal being passed to the tiling engine.

One current implementation of the invention guarantees non-intersecting polygon sides by restricting the polygons rendered to be planar. They may have up to 512 vertices. Polygons may also consist of one or two vertices. The polygon "end" bit is set at the last vertex and processed by the rendering engine. The polygon is tagged with a two bit rendering code to select mesh, transparent, or Gouraud shading. The rendering engine also accomplishes a fine clip to the screen for the polygon and implements a smoothing function for lines.

An optional aerial reconnaissance (RECE) photo mode causes the GAP to texture map an aerial reconnaissance photograph onto the DTED data base. In this mode the hue interpolation of the rendering engine is inhibited as each pixel of the warping is assigned a color from the RECE photo. The intensity component of the color is dithered in a well known manner as a function of the surface normal as well as the Z-depth. These pixels are then processed by the rendering engine for Z-buffer rectification so that other overlays such as threats may be accommodated. The RECE photos used in this mode have been previously warped onto a tessellated geoid data base and thus correspond pixel-for-pixel to the DTED data. See assignee's aforereferenced copending application for A Method of Storage and Retrieval of Digital Map Data Based Upon A Tessellated Geoid System, which is hereby incorporated by reference in its entirety. The photos may be denser than the terrain data. This implies a deeper cache memory to hold the RECE photos. Aeronautical chart warping mode is identical to RECE photos except that aeronautical charts are used in the second cache. DTED warping mode utilizes DTED data to elevation color band aeronautical charts.

The polygon rendering engine may preferably be implemented in a generic interpolation pipeline processor (GIPP) of the type as disclosed in assignee's aforereferenced patent entitled Generic Interpolation Pipeline Processor, which is incorporated herein by reference in its entirety. In one embodiment of the invention, the GIPPs fill in the transformed polygons using a bi-linear interpolation scheme with six axes (X,Y,Z,R,G,B). The primitive will interpolate a 16 bit pair and 8 bit pair of values simultaneously, thus requiring 3 chips for a polygon edge. One embodiment of the system of the invention has been sized to process one million pixels each frame time. This is sufficient to produce a 1K×1K high resolution chart, or a 512×512 DTED frame with an average of four overwrites per pixel during hidden surface removal with GIPPs outputting data at a 60 nsec rate, each FIFO, F1-F4, as shown in FIG. 6, will receive data on the average of every 240 nsec. An even distribution can be assumed by decoding on the lower 2X address bits. Thus, the memory is divided into one pixel wide columns FIG. 6 is discussed in more detail below.

Referring again to FIGS. 4 and 5, the "dots" are passed through the GIPPs without further processing. Thus, the end of each polygon's bit is set. A ZB buffer is needed to change the color of a dot at a given pixel for hidden dot removal. Perspective depth cuing is obtained as the dots get closer together as the range from the viewpoint increases.

Bi-linear interpolation mode operates in plan view on either DLMS or aeronautical charts. It achieves 20 Hz interpolation on a 512×512 display. The GIPPs perform the interpolation function.

DATA BASES

A Level I DTED data base is included in one embodiment of the invention and is advantageously sampled on three arc second intervals. Buffer segments are preferably stored at the highest scales (104.24 nm) and the densest data (13.03 nm). With such a scheme, all other scales can be created. A Level II DTED data base is also included and is sampled at one arc second intervals. Buffer segments are preferably stored only at the densest data (5.21 nm).

A DFAD cultural feature data base is stored in a display list of 2K words for each buffer segment. The data structure consists of an icon font call, a location in cache, and transformation coefficients from model space to world space consisting of scaling, rotation, and position (translation). A second data structure comprises a list of polygon vertices in world coordinates and a color or texture. The DFAD data may also be rasterized and overlaid on a terrain similar to aerial reconnaissance photos.

Aeronautical charts at the various scales are warped into the tessellated geoid. This data is 24 bits deep. Pixel data such as LandSat, FLIR, data frames and other scanned in source data may range from one bit up to 24 bits in powers of two (1,2,4,8,16,24).

FRAME BUFFER CONFIGURATION

Referring again to FIG. 6, the frame buffer configuration of one embodiment of the invention is shown schematically. The frame buffer configuration is implemented by one embodiment of the invention comprises a polygon rendering chip 34 which supplies data to full-frame memory 42. The full-frame memory 42 advantageously includes first-in, first-out buffers (FIFO) $F_1$, $F_2$, $F_3$ and $F_4$. As indicated above with respect to the discussion of the rendering engine, the memory is divided up into one pixel wide columns as shown in FIG. 6. By doing so, however, chip select must changed on every pixel when the master timer 44 shown in FIG. 5 reads the memory. However, by orienting the SHAG scan lines at 90 degrees to the master timer scan lines, the chip select will change on every line. The SHAG starts scanning at the bottom left corner of the display and proceeds to the upper left corner of the display.

With the image broken up in this way, the probability that the GIPP will write to the same FIFO two times in a row, three times, four, and so on can be calculated to determine how deep the FIFO must be. Decoding on the lower order address bits means that the only time the rendering engine will write to the same FIFO twice in a row is when a new scan line is started. At four deep as shown in the frame buffer graph 100, the chances of the FIFO filling up are approximately one in 6.4K. With an image of 1 million pixels, this will occur an acceptably small number of times for most applications. The perspective view transformations for 10,000 polygons with the power and board area constraints that are imposed by an avionics environment is significant. The data throughput for a given scene complexity can be achieved by adding more pipeline in parallel to the architecture. It is desirable to have as few pipelines as possible, preferably one, so that the image reconstruction at the end of the pipeline does not suffer from an arbitration bottleneck for a Z-buffered display memory.

In one embodiment of the invention, the processing throughput required has been achieved through the use of GaAs VSLI technology for parallel pipelines and a parallel frame buffer design has eliminated contention bottlenecks. A modular architecture allows for additional functions to be added to further the integration of the digital map into the avionics suite. The system architecture of the invention has high flexibility while maintaining speed and data throughput. The polygonal data base structure approach accommodate arbitrary scene complexity and a diversity of data base types.

The data structure of the invention is tagged so that any polygon may be rendered via any of the implemented schemes in a single frame. Thus, a particular image may have Gouraud shaded terrain, transparent threat domes, flat shaded cultural features, lines, and dots. In addition, since each polygon is tagged, a single icon can be comprised of differently shaded polygons. The invention embodies a 24 bit color system, although a production map would be scaled to 12 bits. A 12 bit system provides 4K colors and would require a 32K by 8 RGB RAM look-up table (LUT).

MISCELLANEOUS FEATURES

The display formats in one example of the invention are switchable at less than 600 milliseconds between paper chart, DLMS plan and perspective view. A large cache (1 megabit D-RAMs) is required for texture mapping. Other format displays warp chart data over DTED, or use DTED to pseudo-color the map. For example, change the color palate LUT for transparency. The GAP is used for creating a true orthographic projection of the chart data.

An edit mode for three dimensions is supported by the apparatus of the invention. A three dimensional object such as a "pathway in the sky" may be tagged for editing. This is accomplished by first, moving in two dimensions at a given AGL, secondly, updating the AGL in the three dimensional view, and finally, updating the data base.

The overlay memory from the DMC may be video mixed with the perspective view display memory.

Freeze frame capability is supported by the invention. In this mode, the aircraft position is updated using the cursor. If the aircraft flies off the screen, the display will snap back in at the appropriate place. This capability is implemented in plan view only. There is data frame software included to enable roaming through cache memory. This feature requires a two axis roam joystick or similar control. Resolution of the Z-buffer is 16 bits. This allows 64K meters down range.

The computer generated imagery has an update rate of 20 Hz. The major cycle is programmable and variable with no frame extend invoked. The system will run as fast as it can but will not switch ping-pong display memories until each functional unit issues a "pipeline empty" message to the display memory. The major cycle may also be locked to a fixed frame in multiples of 16.6 milliseconds. In the variable frame mode, the processor clock is used for a smooth frame interpolation for roam or zoom. The frame extend of the DMC is eliminated in perspective view mode. Plan view is implemented in the same pipeline as the perspective view. The GPP 105 loads the countdown register on the master timer to control the update rate.

The slowest update rate is 8.57 Hz. The image must be generated in this time or the memories will switch. This implies a pipeline speed of 40 million pixels per second. In a $512 \times 512$ image, it is estimated that there would be 4 million pixels rendered worst case with heavy hidden surface removal. In most cases, only million pixels need be rendered. FIG. 8 illustrates the analysis of pixel over-writes. The minimum requirement for surface normal resolution so that the best image is achieved is 16 bits. Tied to this is the way in which the normal is calculated. Averaging from surrounding tiles gives a smoother image on scale change or zoom. Using one tile is less complex, but results in poorer image quality. Surface normal is calculated on the fly in accordance with known techniques.

DISPLAY MEMORY

This memory is a combination of scene and overlay with a Z-buffer. It is distributed or partitioned for optimal loading during write, and configured as a frame buffer during read-out. The master time speed required is approximately 50 MHz. The display memory resolution can be configured as $512 \times 512 \times 12$ or as $1024 \times 1024 \times 12$. The Z-buffer is 16 bits deep and $1K \times 1K$ resolution. At the start of each major cycle, the Z-values are set to plus infinity (FF Hex). Infinity (Zmax) is programmable. The back clipping plane is set by the DSM over the control bus.

At the start of each major cycle, the display memory is set to a background color. In certain modes such as mesh or dot, this color will change. A background color register is loaded by the DSM over the configuration bus and used to fill in the memory.

VIDEO GENERATOR/MASTER TIMER

The video generator 46 performs the digital to analog conversion of the image data in the display memory to send to the display head. It combines the data stream from the overlay memory of the DMC with the display memory from the perspective view. The configuration bus loads the color map.

A 30 Hz interlaced refresh rate may be implemented in a system employing the present invention. Color pallets are loadable by the GPP. The invention assumes a linear color space in RGB. All colors at zero intensity go to black.

THREE DIMENSIONAL SYMBOL GENERATOR

The three-dimensional symbol generator 38 performs the following tasks:

1. It places the model to world transformation coefficients in the GAP.

2. It operates in cooperation with the geometry engine to multiply the world to screen transformation matrix by the model to world transformation matrix to form a model to screen transformation matrix. This matrix is stored over the model to world transformation matrix.

3. It operates in cooperation with the model to screen transformation matrix to each point of the symbol from the vertex list to transform the generic icon to the particular symbol.

4. It processes the connectivity list in the tiling engine and forms the screen polygons and passes them to the rendering engine.

One example of a three-dimensional symbol generator is described in detail in the assignee's aforereferenced patent application entitled "Three Dimensional Computer Graphic Symbol Generator".

The symbol generator data base consists of vertex list library and 64K bytes of overlay RAM and a connectivity list. Up to 18K bytes of DFAD (i.e., 2K bytes display list from cache shadow RAM $\times$ 9 buffer segments) are loaded into the overlay RAM for cultural feature processing. The rest of the memory holds the threat/intelligence file and the mission planning file for the entire gaming area. The overlay RAM is loaded over the control bus from the DSM processor with the threat and mission planning files. The SHAG loads the DFAD files. The symbol libraries are updated via the configuration bus.

The vertex list contains the relative vertex positions of the generic library icons. In addition, it contains a 16 bit surface normal, a one bit end of polygon flag, and a one bit end of symbol flag. The table is $32K \times 16$ bits. A maximum of 512 vertices may be associated with any given icon. The connectivity list contains the connectivity information of the vertices of the symbol. A 64K by 12 bit table holds this information.

A pathway in the sky format may be implemented in this system. It consists of either a wire frame tunnel or an elevated roadbed for flight path purposes. The wire frame tunnel is a series of connected transparent rectangles generated by the tiling engine of which only the edges are visible (wire mesh). Alternatively, the polygons may be precomputed in world coordinates and stored in a mission planning file. The roadbed is similarly comprised of polygons generated by the tiler along a designated pathway. In either case, the geometry engine must transform these polygons from object space (world coordinate system) to screen space. The transformed vertices are then passed to the rendering engine. The parameters (height, width, frequency) of the tunnel and roadbed polygons are programmable.

Another symbol used in the system is a waypoint flag. Waypoint flags are markers consisting of a transparent or opaque triangle on a vertical staff rendered in perspective. The waypoint flag icon is generated by the symbol generator as a macro from a mission planning file. Alternatively, they may be precomputed as polygons and stored. The geometry engine receives the vertices from the symbol generator and performs the perspective transformation on them. The geometry engine passes the rendering engine the polygons of the flag staff and the scaled font call of the alphanumeric symbol. Plan view format consists of a circle with a number inside and is not passed through the geometry engine.

DFAD data processing consists of a generalized polygon renderer which maps 32K points possible down to 256 polygons or less for a given buffer segment. These polygons are then passed to the rendering engine. This approach may redundantly render terrain and DFAD for the same pixels but easily accommodates declutter of individual features. Another approach is to rasterize the DFAD and use a texture warp function to color the terrain. This would not permit declutter of individual features but only classes (by color). Terrain color show-through in sparse overlay areas would be handled by a transparent color code (screen door effect). No verticality is achieved.

There are 298 categories of aerial, linear, and point features. Linear features must be expanded to a double line to prevent interlace strobing. A point feature contains a length, width, and height which can be used by the symbol generator for expansion. A typical lake contains 900 vertices and produces 10 to 20 active edges for rendering at any given scan line. The number of vertices is limited to 512. The display list is 64K bytes for a 1:250K buffer segment. Any given feature could have 32K vertices.

Up to 2K bytes of display list per buffer segment DTED is accommodated for DFAD. The DSM can tag the classes or individual features for clutter/declutter by toggling bits in the overlay RAM of the SHAG.

The symbol generator processes macros and graphic primitives which are passed to the rendering engine. These primitives include lines, arcs, alphanumerics, and two dimensional symbology. The rendering engine draws these primitives and outputs pixels which are anti-aliased. The GAP transforms these polygons and passes them to the rendering engine. A complete 4×4 Euler transformation is performed. Typical macros include compass rose and range scale symbols. Given a macro command, the symbol generator produces the primitive graphics calls to the rendering engine. This mode operates in plan view only and implements two dimensional symbols. Those skilled in the art will appreciate that the invention is not limited to specific fonts.

Three dimensional symbology presents the problem of clipping to the view volume. A gross clip is handled by the DSM in the cache memory at scan out time. The base of a threat dome, for example, may lie outside the orthographic projection of the view volume onto cache, yet a part of its dome may end up visible on the screen. The classical implementation performs the functions of tiling, transforming, clipping to the view volume (which generates new polygons), and then rendering. A gross clip boundary is implemented in cache around the view volume projection to guarantee inclusion of the entire symbol. The anomaly under animation to be avoided is that of having symbology sporadically appear and disappear in and out of the frame at the frame boundaries. A fine clip to the screen is performed downstream by the rendering engine. There is a 4K boundary around the screen which is rendered. Outside of this boundary, the symbol will not be rendered. This causes extra rendering which is clipped away.

Threat domes are represented graphically in one embodiment by an inverted conic volume. A threat/intelligence file contains the location and scaling factors for the generic model to be transformed to the specific threats. The tiling engine contains the connectivity information between the vertices and generates the planar polygons. The threat polygons are passed to the rendering engine with various viewing parameters such as mesh, opaque, dot, transparent, and so forth.

Graticles represent latitude and longitude lines, UTM klicks, and so forth which are warped onto the map in perspective. The symbol generator produces these lines.

Freeze frame is implemented in plan view only. The cursor is flown around the screen, and is generated by the symbol generator.

Programmable blink capability is accommodated in the invention. The DSM updates the overlay RAM toggle for display. The processor clock is used during variable frame update rate to control the blink rate.

A generic threat symbol is modeled and stored in the three dimensional symbol generation library. Parameters such as position, threat range, and angular threat view are passed to the symbol generator as a macro call (similar to a compass rose). The symbol generator creates a polygon list for each threat instance by using the parameters to modify the generic model and place it in the world coordinate system of the terrain data base. The polygons are transformed and rendered into screen space by the perspective view pipeline. These polygons form only the outside envelope of the threat cone.

This invention has been described herein in considerable detail in order to comply with the Patent Statues and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system for providing a texture mapped perspective view for a digital map system wherein objects are transformed from texture space having U, V coordinates to screen space having X, Y coordinates comprising:
   (a) a cache memory means for storing terrain data including elevation posts, wherein the cache memory means includes an output and an address bus;
   (b) a shape address generator means for scanning cache memory having an ADDRESS SIGNAL coupled to the cache memory means address bus wherein the shape address generator means scans the elevation posts out of the cache memory means;
   (c) a geometry engine coupled to the cache memory means output to receive the elevation posts scanned from the cache memory by the shape address generator means, the geometry engine including means for
      i. transformation of the scanned elevation posts from object space to screen space so as to generate transformed vertices in screen coordinates for each elevation post, and
      ii. generating three dimensional coordinates;
   (d) a tilling engine coupled to the geometry engine for generating planar polygons from the generated three dimensional coordinates;
   (e) a symbol generator to the geometry engine for transmitting a vertex list to the geometry engine wherein the geometry engine operates on the vertex list to transform the vertex list into screen space X, Y coordinates and passes the screen space X, Y coordinates to the tilling engine for generating planar polygons which form icons for display and processing information from the tilling engine into symbols,
   (f) a texture engine means coupled to receive the ADDRESS SIGNAL from the shape address generator means including a texture memory and including a means for generating a texture vertex address to texture space correlated to an elevation post address and further including a means for generating a texture memory address for scanning the texture memory wherein the texture memory provides texture data on a texture memory data bus in response to being scanned by the texture memory address;
   (g) a rendering engine having an input coupled to the tilling engine and the texture memory data bus for generating image data from the planar polygons; and
   (h) a display memory for receiving image data from the rendering engine output wherein the display memory includes at least four first-in, first-out memory buffers.

2. The apparatus of claim 1 wherein each polygon has a surface and the rendering means assigns one color across the surface of each polygon.

3. The apparatus of claim 1 wherein the vertices of each polygon have an intensity and the rendering means interpolates the intensities between the vertices of each polygon in a linear fashion.

4. The apparatus of claim 1 wherein the rendering means further includes means for generating transparent polygons and passing the transparent polygon to the display memory.

5. A method for providing a texture mapped perspective view for a digital map system having a cache memory, a geometry engine coupled to the cache memory, a shape address generator coupled to the cache memory, a tiling engine coupled to the geometry engine, a symbol generator coupled to the geometry engine and the tiling engine, a texture engine coupled to the cache memory, a rendering engine coupled to the tiling engine and the texture engine, and a display memory coupled to the rendering engine, wherein objects are transformed from texture space having U, V coordinates to screen space having X, Y coordinates, the method comprising the steps of:

(a) storing terrain data, including elevation posts, in the cache memory;

(b) scanning the cache memory to retrieve the elevation posts;

(c) transforming the terrain data from elevation posts in object space to transformed vertices in screen space, and (d) generating planar polygons from the generated three dimensional coordinates;

(e) transmitting a vertex list to the geometry engine, operating the geometry engine to transform the vertex list into screen space X, Y coordinates and passing the screen space X, Y coordinates to the tiling engine for generating planar polygons which form icons for display;

(f) tagging elevation posts with corresponding addresses in texture space;

(g) generating image data in the rendering engine from the planar polygons and the tagged elevation posts; and (h) storing the generated image data in the display memory wherein the display memory comprises at least four first-in, first-out memory buffers and the step of storing the generated images includes storing the generated image data in the at least four First-in, First-out memory buffers.

6. The method of claim 5 wherein each polygon has a surface and wherein the step of generating image data further includes the steps of assigning one color across the surface of each polygon.

7. The method of claim 5 wherein the vertices of each polygon have an intensity and the step of generating image data further includes the step of interpolating the intensities between the vertices of each polygon in a linear fashion.

8. The method of claim 5 wherein the step of generating image data further includes the step of generating transparent polygons and passing the transparent polygons to the display memory.

* * * * *

UNITED STATES PATENT AND TRADEMARK OFFICE
CERTIFICATE OF CORRECTION

PATENT NO. : 5,179,638
DATED : January 12, 1993
INVENTOR(S) : John F. Dawson, Thomas D. Snodgrass, and James A. Cousens It is certified that error appears in the above-indentified patent and that said Letters Patent is hereby corrected as shown below:

Column 17, line 21, after "and" insert --generating three dimensional coordinates for the transformed vertices in screen space--.

Signed and Sealed this

Twenty-second Day of March, 1994

*Attest:*

BRUCE LEHMAN

*Attesting Officer*     *Commissioner of Patents and Trademarks*